April 21, 1970

S. R. CROCKETT 3,508,019

APOGEE SENSING SWITCH

Filed Nov. 29, 1967

INVENTOR.
SYDNEY R. CROCKETT

BY

ATTORNEYS

United States Patent Office 3,508,019
Patented Apr. 21, 1970

3,508,019
APOGEE SENSING SWITCH
Sydney R. Crockett, Oxnard, Calif., assignor to the United States of America as represented by the Secretary of the Navy
Filed Nov. 29, 1967, Ser. No. 686,395
Int. Cl. H01h *35/14, 35/32*
U.S. Cl. 200—61.45          7 Claims

ABSTRACT OF THE DISCLOSURE

A switch sensitive to conditions occurring when a missile reaches its maximum altitude. It includes a pressure responsive bellows containing a normally caged conductive sphere. Decrease in ambient pressure incident to higher altitudes causes the bellows to expand and release the sphere, thereafter change in missile attitude causes the sphere to move to one side closing an electrical circuit.

---

The invention described herein may be manufactured and used by or for the Government of the United States of America for governmental purposes without the payment of any royalties thereon or therefor.

BACKGROUND OF THE INVENTION

(1) Field of invention

In the launching of missiles, probes and similar vehicles into the earth's atmosphere or into space it is frequently desirable to time an event to coincide with the apogee portion of its flight path. For example, it may be desirable to eject a payload or take an instrumented reading, or ignite a second stage of the missile, etc.

(2) Description of the prior art

In the use of high altitude probe vehicles considerable research has been performed in providing the vehicles with a means of determining the apogee including clock devices as well as pyro-fuse time delays. However such research has not proved to be reliable or accurate since the devices of the prior art cannot anticipate in-flight factors which may affect the maximum altitude the vehicle may achieve and no other means are present in the art for determining the vehicle apogee. The present invention is believed to fill a long existing need in the art.

SUMMARY OF THE INVENTION

The present invention relates to a switch for sensing the apogee of missiles or similar vehicles and involves a housing in which are disposed a bellows and a contact sphere. At the arming altitude of the vehicle the bellows moves releasing the sphere and when the apogee is reached the sphere falls to one side closing an electrical circuit.

Accordingly it is an object of the present invention to provide a switch simple in design yet accurate in operation for sensing the exact apogee of probe vehicles.

It is also an object of this invention to provide an apogee sensing switch which completes an electrical circuit when maximum altitude is reached.

It is a further object of this invention to provide an apogee sensing switch for probe vehicles which is supported within the vehicle and becomes armed only at a designated altitude; and then at the vehicle apogee, an electrical circuit is completed.

Other objects, advantages, and novel features of the invention will become apparent from the following detailed description of the invention when considered in conjunction with the accompanying drawings.

BRIEF DECRIPTION OF THE DRAWINGS

DESCRIPTION OF THE PREFERRED EMBODIMENT

Figure 2:
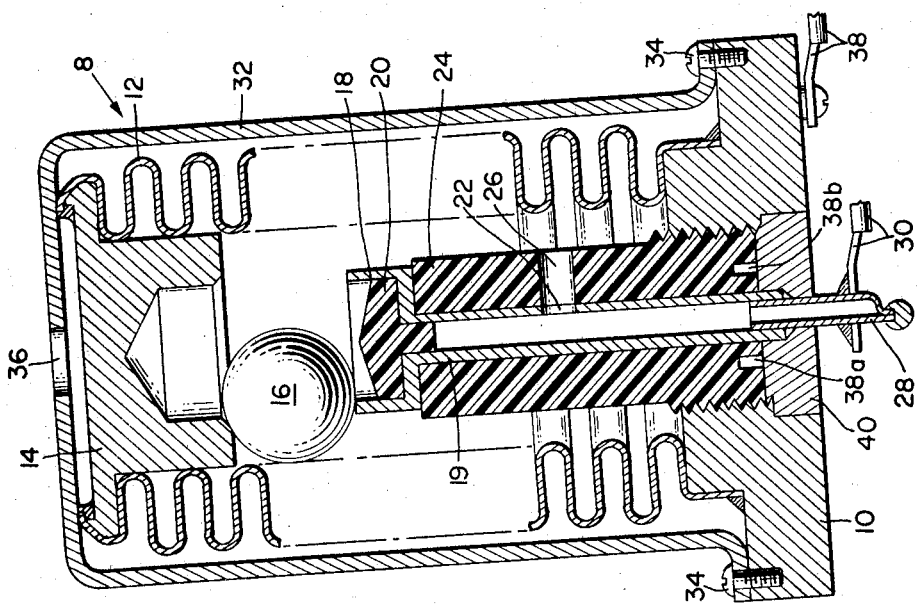
FIGURE 2 is also an elevational sectional view at the vehicle's apogee with the bellows in an expanded position, and the contact sphere displaced to one side wherein the circuit is completed.

Referring now to the drawings, the embodiment illustrated shows the switch of the present invention as 8 and includes a conductive base plate 10 that supports a flexible bellows 12 sealed at the top by a bellows cap 14. The aforesaid cap 14 extends into the interior of the bellows 12 and is designed to retain a contact ball 16 in an immovable position which is more fully discussed below. An electric terminal 38 is attached in a suitable manner to the under surface of the said base plate 10.

A hollow contact ring 18 having a depending hollow stem 19 and being preferably gold plated in order to provide a better electrical conducting capability is positioned within the interior of the bellows 12 in a vertical relationship relative to the base plate 10 and a ball insulator cap 20 is supported on the interior end of the contact ring 18. A vent passage 22 is positioned in the side of the said contact ring.

An internal contact ring support 24 having a central opening therein and being threaded at one end is positioned around the contact ring 18 and is screwed into the base plate 10 until its inner end is flush against the edge of the said contact ring. It will be noted that the distance between the bellows cap 14 and the contact ring 18 can be slightly varied depending on the length that the contact ring support 24 is screwed into the base plate 10. However the vent 26 in the contact ring support 24 must coincide with the contact ring vent 22 in order to open the interior of the bellows 12 to the interior of the contact ring 18. The contact ring support 24 is preferably constructed of bakelite plastic in order to render it a satisfactory insulator and to provide a required sturdiness and toughness thereto. Openings 38a, b positioned in the threaded end of the contact ring support 24 provide a means by which spanner wrench prongs can be inserted to screw the contact ring support to its required distance into the base plate 10.

Connected to the outer end of the contact ring 18 is a capillary tube 28, thruogh which the interior of the bellows 12 may be evacuated via the vent 26 and the contact ring vent 22 until the pressure within the bellows 12 is at the same level as that of a desired altitude and the reason therefore will become apparent later in the application. The atmospheric gases are preferably removed entirely from the interior of the bellows 12 and a dry inert nitrogen gas is substituted in order to prevent any possible corrosion on the conducting surfaces which could result in a malfunction of the device. Once the desired bellows pressure is obtained the capillary tube 28 is permanently sealed. It should be noted that the one electrical terminal 30 is affixed to the said capillary 28.

A protective housing 32 is positioned over the bellows 12 and is connected to the base 10 by the screws 34. It may be made of an insulating material of suitable quality to render rigidity and strength thereto and has an opening therein at 36 to admit prevailing atmospheric pressure within the housing.

Figure 1:
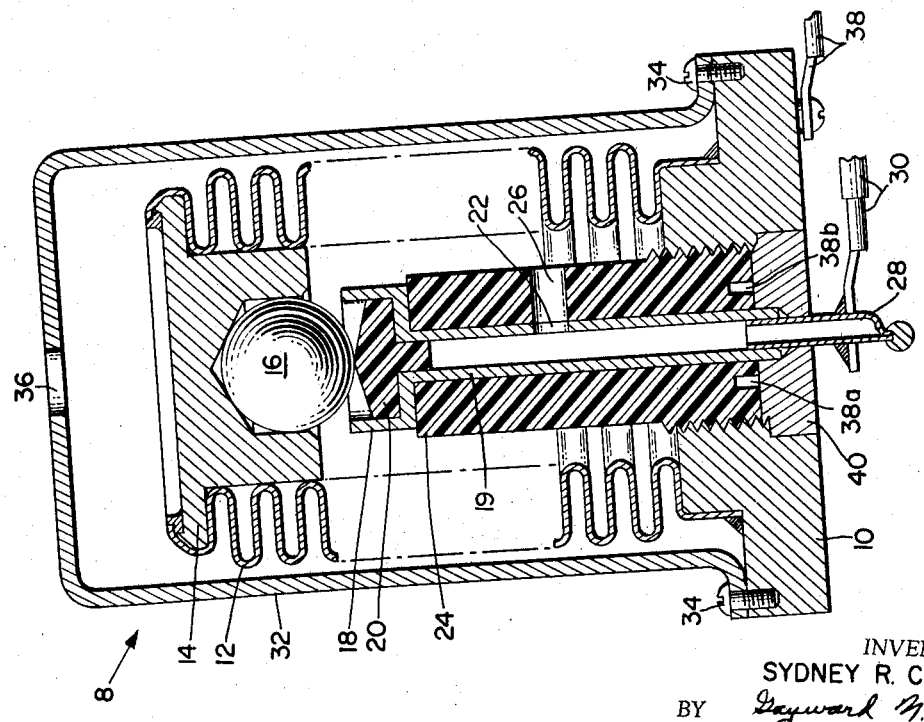
FIG. 1 is an elevational sectional view of the present invention at the time of vehicle launch in which the bellows are contracted and the contact sphere is caged in an immovable position thereby preventing the sphere from completing an electrical circuit.

As stated previously there is supported flush on the inner side of the contact ring 18 a ball insulator cap 20. It will be noted as shown in FIGURE 1 that when the bellows 12 is in a contracted position, the conductive contact ball 16 is held in a central immovable position against the insulator cap 20 by the ball cap 14 thereby preventing any completion of an electrical circuit. However, as shown in FIGURE 2 at the desired altitude to which the pressure within the bellows 12 corresponds, the said bellows 12 will expand. Since the cap 14 is sealed to the bellows, it is lifted away from the contact ball 16, and, at the exact apogee of the probe vehicle within which the present device is incorporated, the contact ball 16 will deviate from its central position and drop against the edge of the contact ring 18 and the cap 14 thereby closing an electrical circuit through the capillary 28, the contact ring 18, the ball 16, the cap 14, the bellows 12 and the base plate 10 to terminal 38.

It should be noted that the contact ring 18 and the capillary 28 are sealed in position by a suitable filleting material 40, such as a solder or plastic.

Obviously many modifications and variations of the present invention are possible in the light of the above teachings. It is therefore to be understood that within the scope of the appended claims the invention may be practised otherwise than as specifically described.

What is claimed is:

1. An electrical switch means which operates to complete an electric circuit when subjected to the changes in physical forces incident to a missile vehicle apogee in its flight path comprising:
    a first electrical contact;
    a second electrical contact positioned in spaced relationship from said first contact;
    an independent conductive element positioned between said first and second contacts and designed to establish a conductive path between said first and second contacts;
    means for restraining said independent conductive element from establishing such conductive path; and,
    expansible means responsive to ambient pressure adapted to remove the restraining means;
    said independent conductive element being responsive to changes in momentum forces acting upon said vehicle.

2. The switch as defined in claim 1 wherein said means for removing said restraining means includes a sealed bellows which is responsive to ambient pressure at a desired altitude.

3. The switch as defined in claim 2 wherein said bellows is designed to enclose the said first and second electrical contacts and said independent conductive element in sealed relationship.

4. The switch as defined in claim 2 wherein said means for normally restraining said independent conductive element from establishing a conductive path between said first and second contacts is sealed into the said bellows and is responsive to movements thereof.

5. An electrical switch means which operates to complete an electric circuit when subjected to the changes in physical forces incident to a missile vehicle in its flight path comprising:
    a first electrical contact;
    a second electrical contact engageable with the first, said second electrical contact being in the form of a sphere;
    means for normally restraining said second contact from such engagement; and,
    a sealed bellows adapted to remove said restraining means, said bellows being responsive to ambient pressure at a desired altitude,
    said sphere shaped second electrical contact being movable responsive to changes in momentum forces acting upon said vehicle.

6. The switch as defined in claim 2 wherein said electrical contacts are coated with gold to enhance the conductance capabilities thereof.

7. The switch as defined in claim 3 wherein an inert gas is substituted for the air in said bellows to prevent corrosion of said electrical contacts sealed therein.

References Cited

UNITED STATES PATENTS

| | | | |
|---|---|---|---|
| 2,415,086 | 2/1947 | Detwiler | 200—61.45 |
| 2,658,120 | 11/1953 | Murphy. | |
| 2,761,927 | 9/1956 | Szypulski. | |
| 2,912,534 | 11/1959 | Rowell et al. | 200—61.45 X |
| 2,984,719 | 5/1961 | Higgs et al. | 200—61.45 X |
| 3,368,044 | 2/1968 | Green et al. | 200—83 X |
| 2,263,636 | 11/1941 | Marsh. | |

ROBERT S. MACON, Primary Examiner

R. A. VANDERHYE, Assistant Examiner

U.S. Cl. X.R.

200—83, 61.52